(12) United States Patent
Boland et al.

(10) Patent No.: US 7,305,734 B2
(45) Date of Patent: Dec. 11, 2007

(54) WINDSCREEN WIPER DEVICE

(75) Inventors: Xavier Boland, Arlon (BE); Pierre Henin, Bethefortains (BE); Eric Coos, Cheoeres (FR)

(73) Assignee: Federal-Mogul S.A., Aubange (BE)

( * ) Notice: Subject to any disclaimer, the term of this patent is extended or adjusted under 35 U.S.C. 154(b) by 0 days.

(21) Appl. No.: 10/528,856

(22) PCT Filed: Sep. 23, 2003

(86) PCT No.: PCT/EP03/50646

§ 371 (c)(1),
(2), (4) Date: Sep. 12, 2005

(87) PCT Pub. No.: WO2004/028875

PCT Pub. Date: Apr. 8, 2004

(65) Prior Publication Data

US 2006/0191093 A1   Aug. 31, 2006

(30) Foreign Application Priority Data

Sep. 24, 2002   (EP) .................................. 02102379

(51) Int. Cl.
*B60S 1/40* (2006.01)
*B60S 1/34* (2006.01)

(52) U.S. Cl. .............................. 15/250.32; 15/250.351; 15/250.201

(58) Field of Classification Search ............. 15/250.32, 15/250.43, 250.44, 250.451, 250.452
See application file for complete search history.

(56) References Cited

U.S. PATENT DOCUMENTS 4,418,441 A   12/1983   van den Berg .......... 15/250.42

6,599,051 B1 *   7/2003   Jarasson ...................... 403/326
6,668,419 B1 *   12/2003   Kotlarski ................. 15/250.43

FOREIGN PATENT DOCUMENTS

| | | | |
|---|---|---|---|
| DE | 10130903 | * | 5/2002 |
| EP | 0 267 010 | | 5/1988 |
| FR | 2 781 741 | | 2/2000 |
| FR | 2 788 027 | | 7/2000 |
| FR | 2 804 923 | | 8/2001 |
| WO | 00/07857 | * | 2/2000 |
| WO | WO 02/034594 | | 10/2001 |
| WO | WO 02/053421 | | 11/2001 |

* cited by examiner

*Primary Examiner*—Gary K. Graham
(74) *Attorney, Agent, or Firm*—Robert L. Stearns; Dickinson Wright PLLC.

(57) ABSTRACT

A windscreen wiper device (1) comprising an elastic, elongated carrier element, as well as an elongated wiper blade (2) of a flexible material, which can be placed in abutment with a widescreen to be wiped, which wiper blade (2) includes opposing longitudinal grooves (3) on its longitudinal sides, in which grooves (3) spaced-apart longitudinal strips (4) of the carrier element are disposed, wherein neighbouring ends of said longitudinal strips (4) are interconnected by a respective connecting piece (6), which windscreen wiper device comprises a connecting device (7) for an oscillating arm (8), wherein said oscillating arm (8) is pivotally connected to said connecting device (7) about a pivot axis near one end, with the interposition of a joint part (12), with the special feature that said connecting device (7) is positioned at least substantially within said joint part (12).

4 Claims, 4 Drawing Sheets

WINDSCREEN WIPER DEVICE

BACKGROUND OF THE INVENTION

1. Technical Field

The present invention relates generally to a windscreen wiper device. More particularly, the invention relates to a windscreen wiper device which includes an elastic elongated carrier element and an elongated wiper blade of a flexible material.

2. Related Art

The present invention relates to a windscreen wiper device comprising an elastic, elongated carrier element, as well as an elongated wiper blade of a flexible material, which can be placed in abutment with a windscreen to be wiped, which wiper blade includes opposing longitudinal grooves on its longitudinal sides, in which grooves spaced-apart longitudinal strips of the carrier element are disposed, wherein neighbouring ends of said longitudinal strips are interconnected by a respective connecting piece, which windscreen wiper device comprises a connecting device for an oscillating arm, wherein said oscillating arm is pivotally connected to said connecting device about a pivot axis near one end, with the interposition of a joint part.

Such a windscreen wiper device is known from German patent publication no. 101 30 903 (Robert Bosch GmbH). This prior art windscreen wiper device is designed as a "yokeless" wiper device, wherein no use is made of several yokes pivotally connected to each other, but wherein the wiper blade is biassed by the carrier element, as a result of which it exhibits a specific curvature. This known device has a first coupling half fixed to the oscillating arm, as well as a second coupling half fixed to the wiper blade, wherein two parallel interspaced supporting walls of the second coupling half are oriented in the longitudinal direction of the wiper blade. Each end of a pivot pin for a joint part, which is mounted on the pivot pin in a manner that permits it to swing between the supporting walls and which is provided for connecting the oscillating arm, is held in these supporting walls. In order to obtain protection against environmental influences such as snow, ice and dust, the oscillating arm is u-shaped in the area of its coupling half, whereby the U-base covers the supporting (protective) walls and both U-limbs cover the outer sides of these supporting walls.

A disadvantage of the windscreen wiper device known from the above-mentioned German patent document is that, due to high forces exerted in practice on the connection between the connecting device and the oscillating arm, the reliability of said connection appears to diminish with the passage of time, resulting in play between the connecting device and the oscillating arm. Such a play in practice has proven to lead to frictional contact between these parts and therefore to wear. A further disadvantage thereof is that many constructional parts are involved in the connection between the connecting device and the oscillating arm, making the known windscreen wiper device laborious to manufacture and therefore relatively costly.

SUMMARY OF THE INVENTION

The object of the invention is to overcome these drawbacks of the prior art as indicated above, in particular to provide a windscreen wiper device wherein the connecting device and the oscillating arm are interconnected in a simple though durable and solid manner.

In order to accomplish that objective, a windscreen wiper device of the type referred to in the introduction is characterized in that said connecting device is positioned at least substantially within said joint part. Particularly, this enables to attach said joint part to said connecting device by protrusions of said connecting device at the location of said pivot axis, said protrusions pivotally engaging in recesses provided in said joint part. These protrusions that function as bearing surfaces are spaced far apart, so that the forces exerted on the bearing surfaces will be relatively low. As these protrusions replace the pivot pin as used in the known windscreen wiper device discussed above, less constructional components are used in connecting the connection device and the oscillating arm together. For an optimal articulation at the location of the protrusions the distance between these protrusions divided by the length of the wiper blade, from tip to tip, is larger than 0.02.

In one preferred embodiment of a windscreen wiper device according to the invention said joint part has an at least substantially U-shaped cross-section at the location of its attachment to said connecting device, wherein said joint part in each leg of said U-shaped cross-section is provided with a recess provided coaxially with said pivot axis. Preferably, the protrusions extend outwards on either side of said connecting device (that is, outwardly in lateral direction with respect to the oscillating arm), wherein the protrusions are at least substantially cylindrical. Particularly, the recesses are correspondingly shaped.

In another preferred embodiment of a windscreen wiper device according to the invention said joint part is made of plastic, which includes any synthetic material having some flexibility.

In another preferred embodiment of a windscreen wiper device according to the invention said joint part comprises at least one resilient tongue engaging in a correspondingly shaped hole provided in said oscillating arm. Preferably, the oscillating arm has an at least substantially U-shaped cross-section at the location of its connection to said joint part, wherein said hole is provided in a base of said U-shaped cross-section.

In another preferred embodiment of a windscreen wiper device according to the invention said joint part comprises at least two lateral resilient tongues extending outwardly, wherein the oscillating arm has an at least substantially U-shaped cross-section at the location of its connection to said joint part, and wherein each tongue engages in a correspondingly shaped hole provided in a leg of said U-shaped cross-section.

While mounting the oscillating arm onto the connecting device/joint part, the resilient tongue(s) is/are initially pushed in against a spring force and then allowed to spring back into said hole(s), thus snapping, that is clipping the resilient tongue(s) into the hole(s).

In another preferred embodiment of a windscreen wiper device according to the invention said hole(s) has/have a closed circumference. Such (a) closed hole(s) enhance(s) the retention of the oscillating arm onto the connecting device/joint part in all directions, particularly both horizontally and vertically.

In another preferred embodiment of a windscreen wiper device according to the invention the oscillating arm has an at least substantially U-shaped cross-section at the location of its connection to said joint part, and wherein each leg comprises clamping members which engage around longitudinal sides of said joint part that face away from each other. These clamping members being preferably formed as inwardly bended edges integral with the legs of the U-shaped cross-section, serve to further enhance the retention of the oscillating arm onto the connecting device/joint part in vertical direction, that is perpendicular to the longitudinal direction of the oscillating arm.

BRIEF DESCRIPTION OF THE DRAWINGS

The invention will now be explained in more detail with reference to figures illustrated in a drawing, wherein.

DETAILED DESCRIPTION OF THE PREFERRED EMBODIMENT

Figure 1:
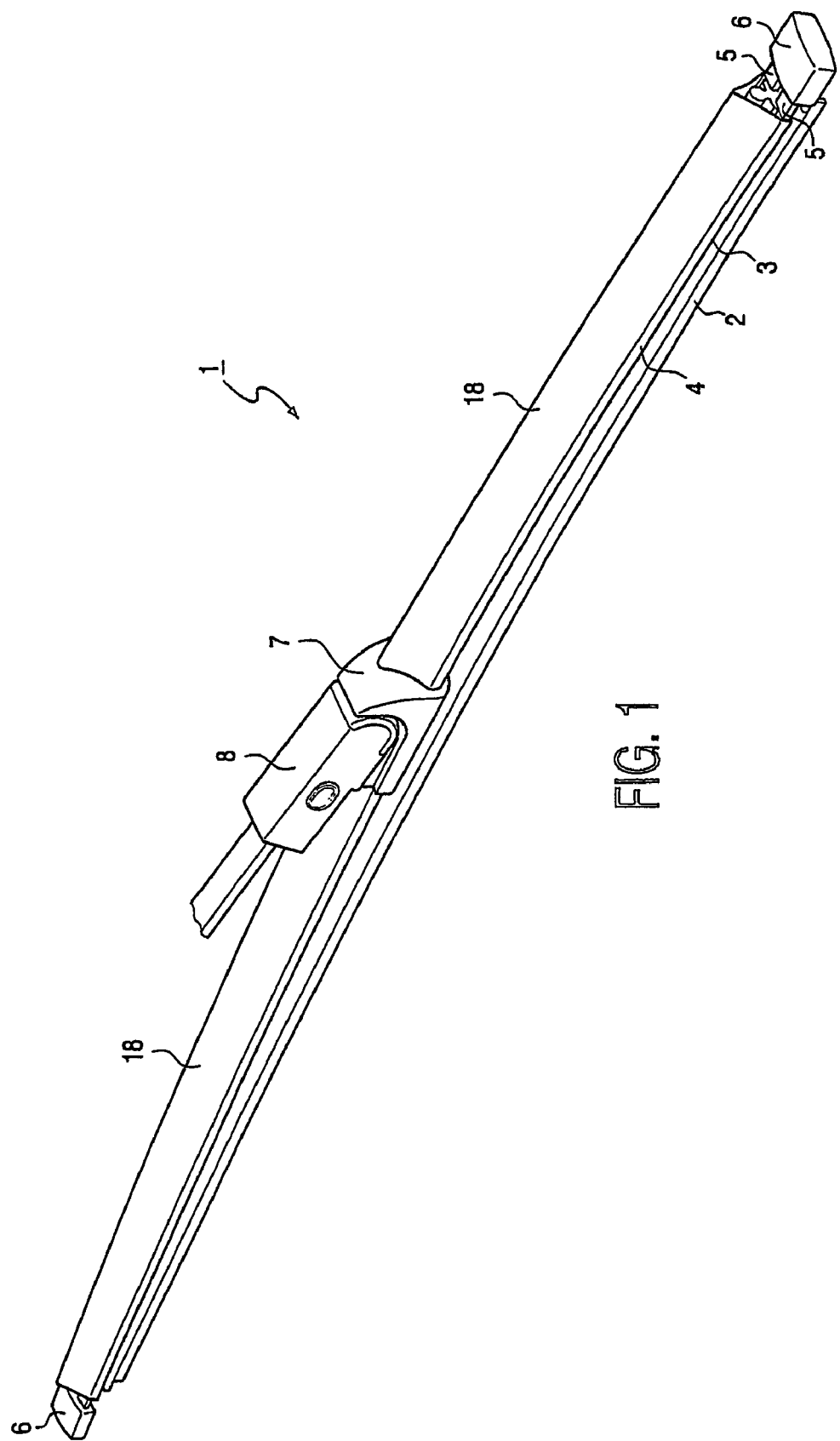
FIG. 1 is a perspective, schematic view of a preferred embodiment of a windscreen device in accordance with the invention.

FIG. 1 shows a preferred variant of a windscreen wiper device 1 according to the invention. Said windscreen wiper device is built up of an elastomeric wiper blade 2, in the longitudinal sides of which opposing longitudinal grooves 3 are formed, and of longitudinal strips 4 made of spring band steel, which are fitted in said longitudinal grooves 3. Said strips 4 form a flexible carrier element for the rubber wiper blade 2, as it were, which is thus biassed in a curved position (the curvature in operative position being that of a windscreen to be wiped). Neighbouring ends 5 of strips 4 are interconnected on either side of the windscreen wiper device 1 by means of connecting pieces 6 functioning as clamping members. In this embodiment, the connecting pieces 6 are separate constructional elements, which may be form-locked ("positive locking" or "having positive fit") as well as force-locked to the ends 5 of strips 4. In another preferred variant, said connecting pieces 6 are in one piece with the strips 4 made of spring band steel. In the latter case said connecting pieces form transverse bridges for the strips 4, as it were.

The windscreen wiper device 1 is furthermore built up of a connecting device 7 of plastic material for an oscillating wiper arm 8. Connecting device 7 comprises clamping members 9 that are integral therewith, which engage around longitudinal sides of the strips 4 that face away from each other, as a result of which the connecting device 7 is firmly attached to the unit consisting of wiper blade 2 and strips 4. The oscillating wiper arm 8 is pivotally connected to the connecting device 7 about a pivot axis near one end, and that in the following manner.

Figure 2A:
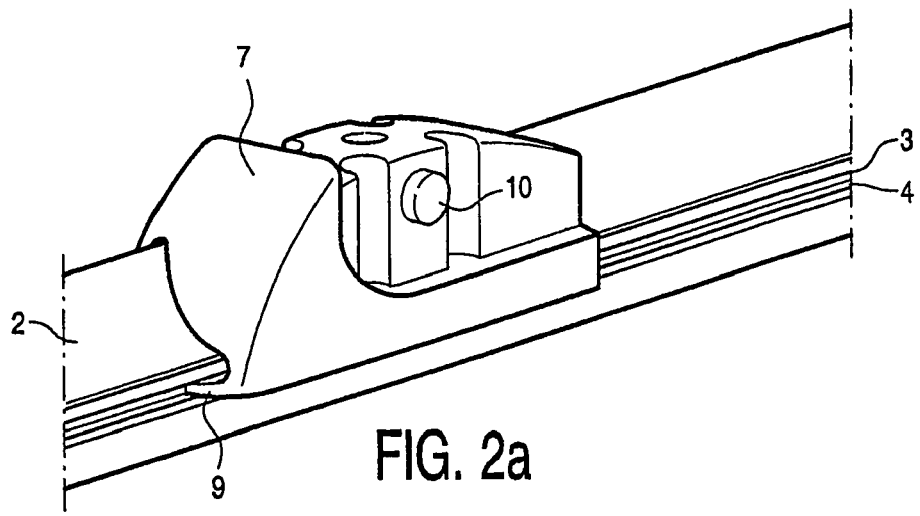
FIGS. 2 and 3 show details of the windscreen wiper device of FIG. 1, wherein various successive steps are shown for fitting an oscillating wiper arm to a connecting device using two different types of joint parts ("spacers")
Figure 2B:
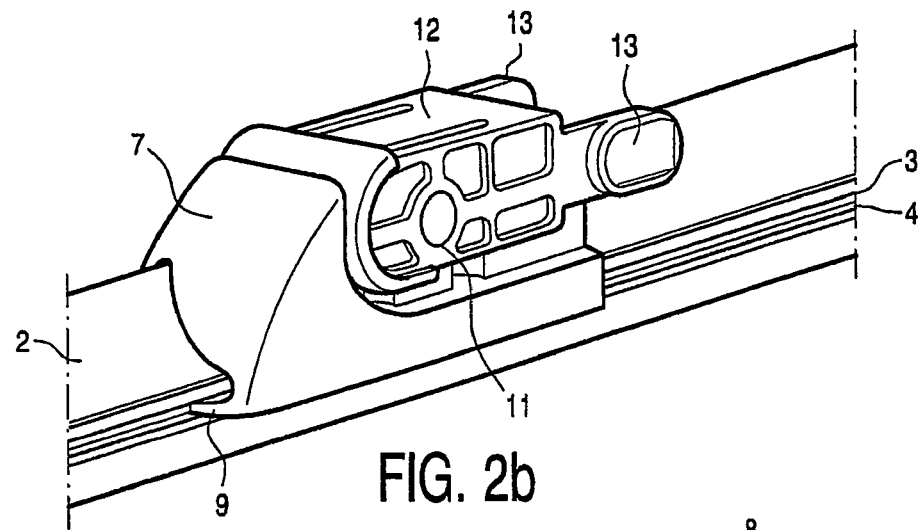
Figure 2C:
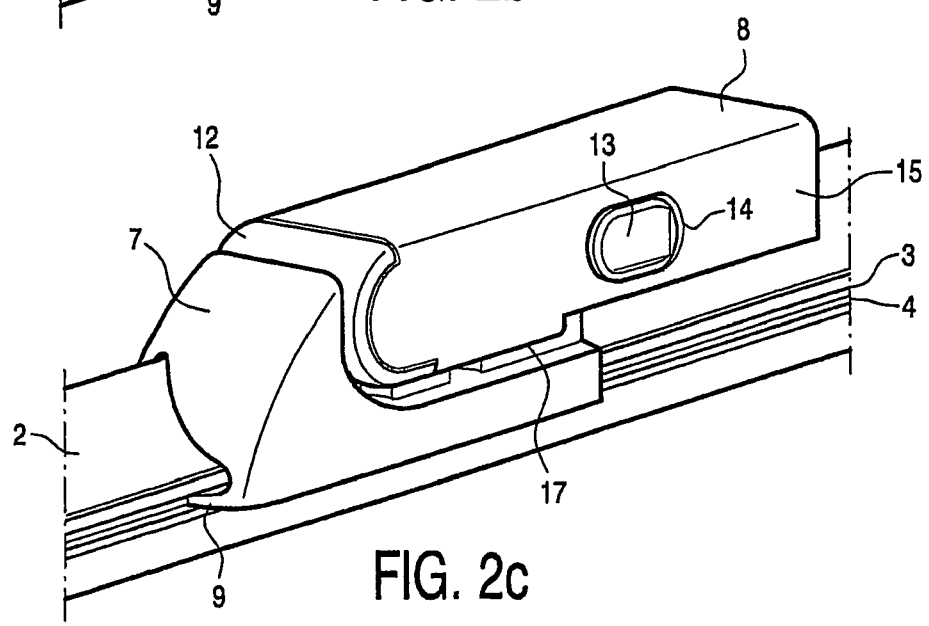

With reference to FIG. 2 the connecting device 7 comprises two cylindrical protrusions 10 extending outwards on either side of said connecting device 7 (FIG. 2a). These protrusions 10 pivotally engage in identically shaped cylindrical recesses 11 of a plastic joint part 12 (FIG. 2b). Said protrusions 10 act as bearing surfaces at the location of a pivot axis in order to pivot the joint part 12 (and the oscillating wiper arm 8 attached thereto) about said pivot axis near one end of said arm 8. The protrusions 10 are preferably in one piece with the connecting device 7; in the alternative, the protrusions 10 are part of a single pivot pin perpendicular to the connecting device 7. Said connecting device 7 may be equipped with a cover or cap in order to obtain an aesthetic appearance thereof, to avoid sharp edges and to provide protection against UV-light etcetera. The joint part 12 comprises two lateral resilient tongues 13 extending outwardly, while the oscillating arm 8 has a U-shaped cross-section at the location of its connection to said joint part 12, so that each tongue 13 engages in an identically shaped hole 14 provided in a leg 15 of said U-shaped cross-section (FIG. 2c).

Figure 3A:
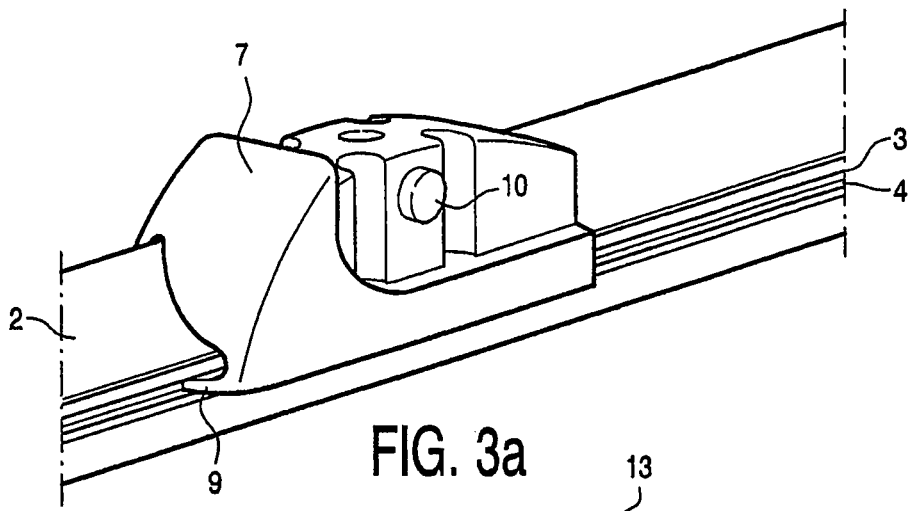
Figure 3B:
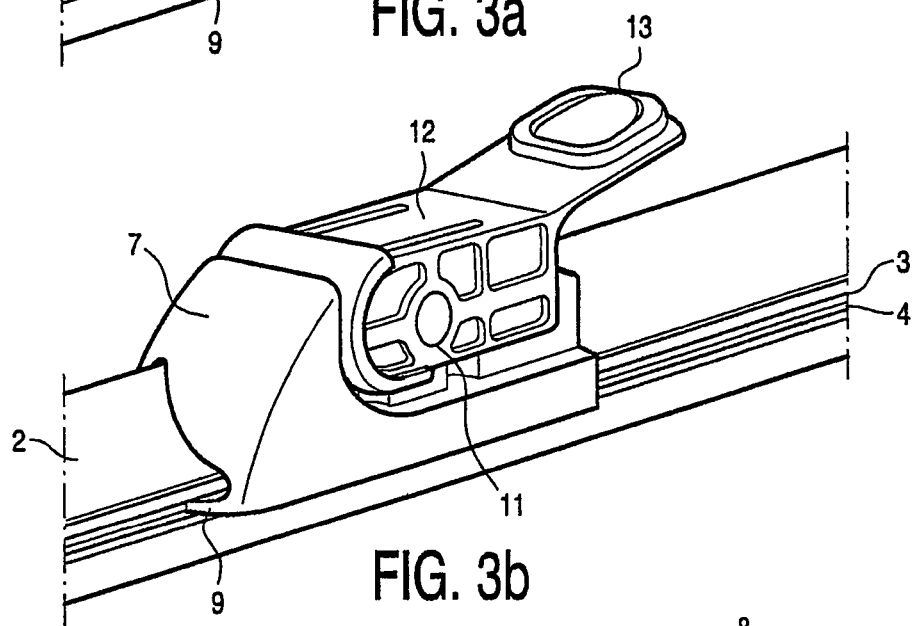
Figure 3C:
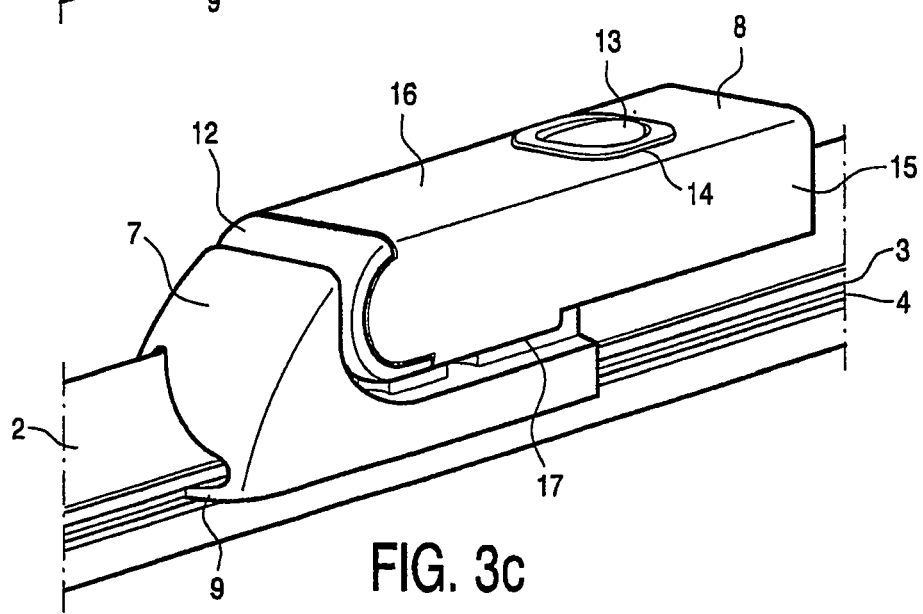

FIGS. 3a, 3b and 3c correspond to FIGS. 2a, 2b and 2c, respectively, with the difference that one resilient tongue 13 in FIG. 3 fitting in a hole 14 provided in a base 16 of the U-shaped cross-section (FIG. 3c).

Referring to both FIGS. 2 and 3, while mounting the oscillating wiper arm 8 onto the connecting device 7/joint part 12, the resilient tongue(s) 13 is/are initially pushed in against a spring force and then allowed to spring back into said hole(s) 14, thus snapping, that is clipping the resilient tongue(s) 13 into the hole(s) 14. This is a so-called bayonet-connection.

Figure 4:
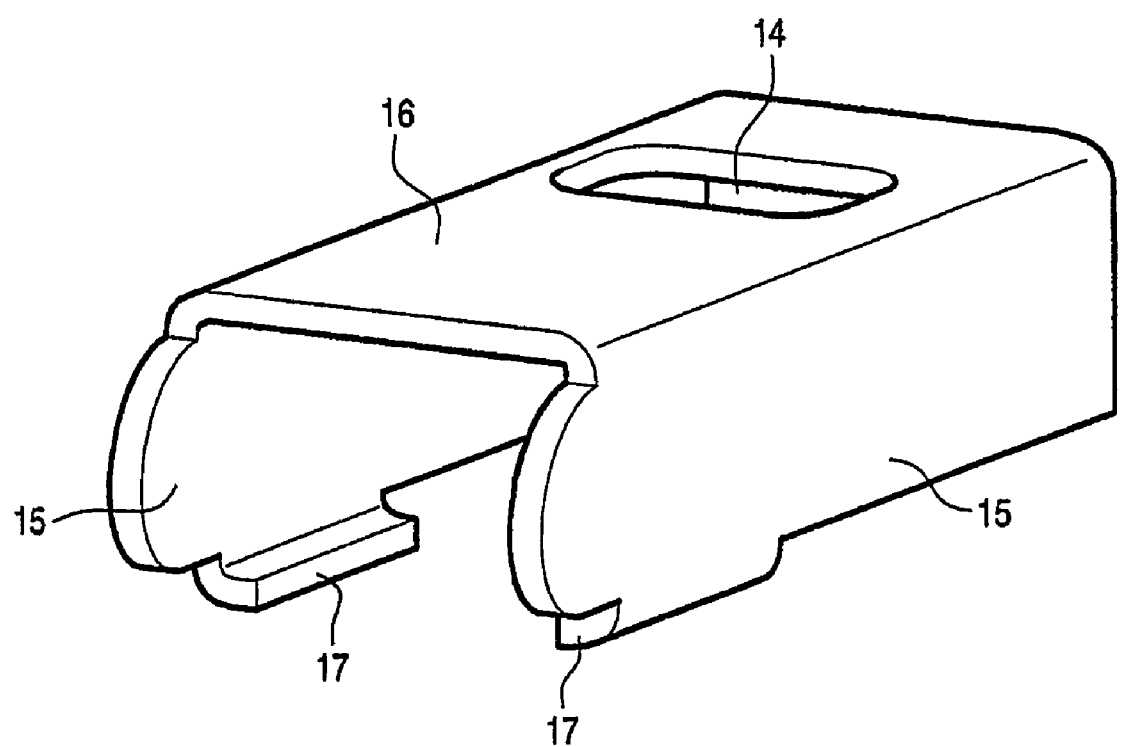
FIG. 4 is a perspective and schematic view of an end of an oscillating wiper arm used in FIG. 3.

Each leg 15 of the U-shaped cross-section comprises clamping members which engage around longitudinal sides of said joint part 12 that face away from each other. In FIGS. 2, 3 and 4 these clamping members are formed as inwardly bended edges 17 integral with the legs 15 of the U-shaped cross-section, serving to further enhance the retention of the oscillating arm 8 onto the connecting device 7/joint part 12 in vertical direction, that is perpendicular to the longitudinal direction of the oscillating wiper arm 8.

Possibly, a spoiler 18 is furthermore provided (FIG. 1).

In order to achieve a good connection at the location of the protrusions 10, the distance between these protrusions 10 (from tip to tip) divided by the length of the wiper blade 2 (from tip to tip) is larger than 0.02 (2%). Said distance between the protrusions 10 preferably varies between 10 and 20 mm.

The invention is not restricted to the variants shown in the drawing, but it also extends to other embodiments that fall within the scope of the appended claims.

The invention claimed is:

1. A flat-blade type windscreen wiper device (1) comprising an elastic, elongated carrier element, as well as an elongated wiper blade (2) of a flexible material, which can be placed in abutment with a windscreen to be wiped, which windscreen wiper device comprises a connecting device (7) for an oscillating arm (8), wherein said oscillating arm (8) is pivotally connected to said connecting device (7) about a pivot axis near one end, with the interposition of a joint part (12), wherein said connecting device (7) is positioned at least substantially within said joint part (12), wherein said joint part (12) is attached to said connecting device (7) by pivotally engaging protrusions (10) of said connecting device (7) at the location of said pivot axis in recesses (11) provided in said joint part (12), wherein said joint part (12) has an at least substantially U-shaped cross-section at the location of its attachment to said connecting device (7), and wherein said joint part (12) in each leg of said U-shaped cross-section is provided with a recess (11) provided coaxially with said pivot axis, wherein the protrusions (10) extend outwards on either side of said connecting device (7) and wherein the protrusions (10) are at least substantially cylindrical, said joint part (12) is made of plastic, wherein said joint part (12) comprises at least one resilient tongue (13) engaging in a correspondingly shaped hole (14) provided in said oscillating arm (8), wherein the oscillating arm (8) has an at least substantially U-shaped cross-section at the location of its connection to said joint part (12), and wherein said hole (14) is provided in a base (16) of said U-shaped cross-section of said arm (8), and wherein each leg (15) of said U-shaped cross-section of said arm (8) comprises a respective clamping member (17) which engages around longitudinal sides of said joint part (12) that face away from each other such that said clamping members (17) together with said substantially U-shaped cross-section are formed as inwardly bended edges (17) integral with said legs (15).

2. A windscreen wiper device according to claim 1, wherein said hole (14) has a closed circumference.

3. A flat-blade type windscreen wiper device (1) comprising an elastic, elongated carrier element, as well as an elongated wiper blade (2) of a flexible material, which can be placed in abutment with a windscreen to be wiped, which windscreen wiper device comprises a connecting device (7) for an oscillating arm (8), wherein said oscillating arm (8) is pivotally connected to said connecting device (7) about a pivot axis near one end, with the interposition of a joint part (12), wherein said connecting device (7) is positioned at least substantially within said joint part (12), wherein said joint part (12) is attached to said connecting device (7) by pivotally engaging protrusions (10) of said connecting device (7) at the location of said pivot axis in recesses (11) provided in said joint part (12), wherein said joint part (12) has an at least substantially U-shaped cross-section at the location of its attachment to said connecting device (7), and wherein said joint part (12) in each leg of said U-shaped cross-section is provided with a recess (11) provided coaxially with said pivot axis, wherein the protrusions (10) extend outwards on either side of said connecting device (7) and wherein the protrusions (10) are at least substantially cylindrical, said joint part (12) is made of plastic, wherein said joint part (12) comprises at least two lateral resilient tongues (13) extending outwardly, wherein the oscillating arm has an at least substantially U-shaped cross-section at the location of its connection to said joint part (12), and wherein each tongue (13) engages in a correspondingly shaped hole (14) provided in a leg (15) of said U-shaped cross-section of said arm (8), and wherein each leg (15) of said U-shaped cross-section of said arm (8) comprises a respective clamping member (17) which engages around longitudinal sides of said joint part (12) that face away from each other such that said clamping members (17) together with said substantially U-shaped cross-section are formed as inwardly bended edges (17) integral with said legs (15).

4. A windscreen wiper device according to claim 3, wherein said holes (14) each have a closed circumference.

* * * * *